May 22, 1973

D. R. TSHUDY 3,734,847

ELECTROPHORETIC DEPOSITION OF POWDERED
MATERIAL ON AN INSULATING SUPPORT
Filed May 27, 1971

INVENTOR.
Donald R. Tshudy
BY
*L. Greenspan*
ATTORNEY

3,734,847
ELECTROPHORETIC DEPOSITION OF POWDERED MATERIAL ON AN INSULATING SUPPORT
Donald Richard Tshudy, Lancaster, Pa., assignor to RCA Corporation, New York, N.Y.
Filed May 27, 1971, Ser. No. 147,326
Int. Cl. B01k 5/02; C23b 13/00
U.S. Cl. 204—181  1 Claim

ABSTRACT OF THE DISCLOSURE

A method for producing a coating of particles, such as phosphor particles, upon an electrically-insulating support comprising
(a) depositing an electrically-conducting undercoating, such as aluminum or magnesium metal, on the support,
(b) electrophoretically depositing a coating of the particles on the undercoating,
(c) and then converting the undercoating to a material which enhances the adherence of the deposited coating to the support.

BACKGROUND OF THE INVENTION

This invention relates to the electrophoretic deposition of a powdered material, particularly luminescent material, on a support.

Electrophoretic deposition of luminescent particles as for the fabrication of phosphor viewing screens includes depositing an undercoating of an electrically-conducting material, such as a metal, on a screen support which is normally a nonconductor such as glass; immersing the undercoated support and a second electrically-conducting object, such as a metal plate, in a suspension containing the particles to be deposited; and then applying a potential between the undercoating and the second object. The applied voltage and resulting current cause particles in the suspension to migrate to and to deposit on the undercoating. After a sufficiently thick coating of particles is deposited, the coated support is removed from the suspension, washed, and then incorporated into a cathode-ray tube.

The undercoating is usually a metal layer that attenuates the transmission of light therethrough to some degree. If the undercoating is permitted to remain in the structure, then the light transmission from the screen through the support is reduced and the viewer sees a dimmer image than what the screen is capable of producing. It has been suggested that the undercoating be removed after the phosphor particle coating is deposited and before the screen is incorporated into a device structure.

U.S. Pat. No. 3,314,871 to Raymond F. Heck et al. suggests using, as the undercoating, a vaporizable material such as zinc metal; and then, after the phosphor particles are deposited, baking the structure to vaporize the undercoating material.

U.S. Pat. No. 3,525,679 to Harold D. Wilcox et al. suggests using as the undercoating a chemically-removable material such as metallic gold; and then, after the phosphor particles are deposited, chemically removing the undercoating material as by immersion in an aqueous solution of a cyanide.

British Pat. No. 1,077,633 to Robert W. Airey suggests using as the undercoating a chemically-removable material such as aluminum metal; and then, after the phosphor particles are deposited, chemically removing the undercoating material as by immersion in an aqueous solution of a persulfate.

In each of the suggested procedures, the undercoating is removed and nothing is done positively towards developing good adherence between the phosphor coating and the support. The removal of the undercoating at least temporarily weakens the adherence of the phosphor layer to the support, making the structure vulnerable to damage.

SUMMARY OF THE INVENTION

In the novel method, the undercoating is of an electrically-conducting material which is convertible to an adherence-promoting material. A coating of particles, for example luminescent particles, is deposited on the undercoating by electrophoresis. Then, after the particles are deposited, the undercoating, instead of being removed, is converted to an adherence-promoting material which enhances the adherence of the deposited coating to the support. Thus, the structure is progressively improved in strength and durability during fabrication and is better able to resist damage during and after fabrication.

DETAILED DESCRIPTION OF THE PREFERRED EMBODIMENTS

EXAMPLE 1

Figure 1:
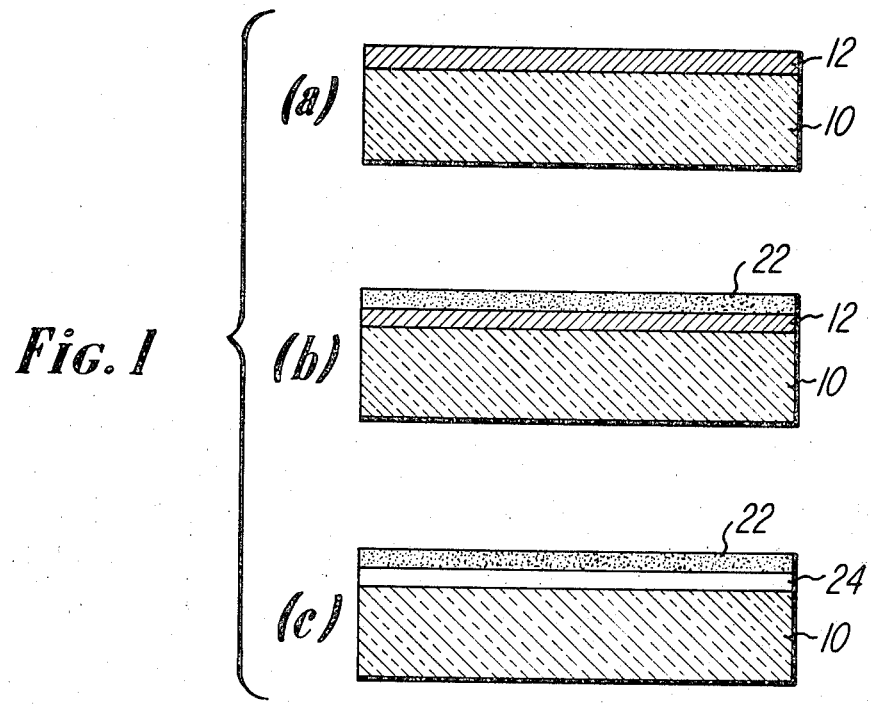
FIG. 1 is a family of sectional views of a substrate illustrating the principal steps of the novel method.
Figure 2:
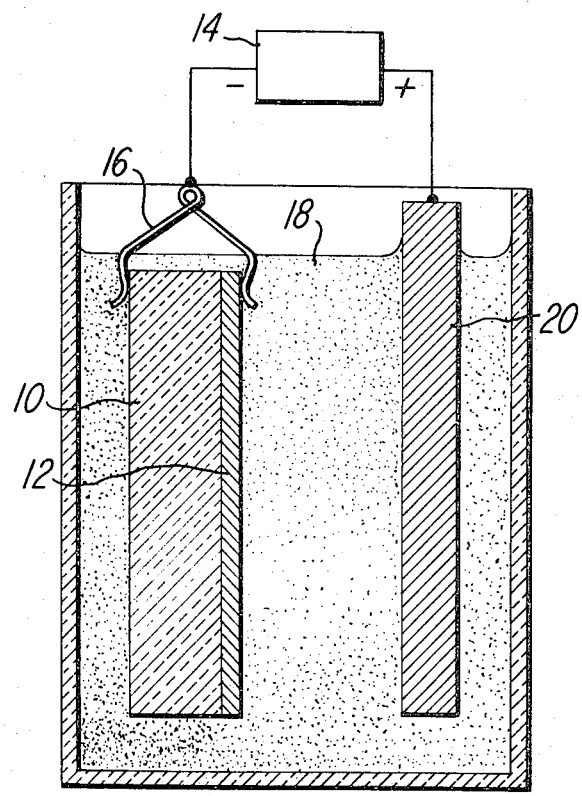
FIG. 2 is a sectional view of an apparatus for electrophoretically depositing particles in the novel method.

Referring to FIGS. 1 and 2, a thin undercoating in the form of a layer 12 of aluminum metal is vapor deposited upon the surface of a glass substrate 10 as shown in FIG. 1(a). The undercoating 12 has an electrical resistance in the range of about 200 to 500 ohms per square. As shown in FIG. 2, the undercoating 12 is electrically connected to a D.C. voltage source 14 with a metal clip 16 and then immersed in a bath 18 comprised of a suspension of phosphor particles. One suitable suspension consists essentially of the following ingredients in about the indicated proportions:

862 milligrams particles of phosphor such as silver-activated zinc sulfide
3.75 milliliters water
375 milliliters isopropyl alcohol
400 milligrams hydrated aluminum nitrate

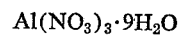

The undercoaing 12 serves as the cathode (negative terminal). A metal plate 20 immersed in the bath 18 and spaced about 2 cm. from the undercoating 12 serves as the anode (positive terminal) in the circuit. A voltage in the range of about 100 to 300 volts is applied across the cathode 12 and the anode 20 so as to cause a current of about 100 to 250 milliamperes to pass therebetween. The current flow causes a coating 22 of particles in the suspension to deposit on the surface of the undercoating 12. After the desired weight of phosphor particles is deposited, typically requiring 2 to 8 minutes of deposition time, the current is stopped, and the coated substrate is removed from the suspension 18.

The coated substrate shown in FIG. 1(b) is rinsed with water and then immersed in dilute ammonium hydroxide (typically 0.0015 weight percent) until the aluminum metal of the undercoating 12 is converted to a transparent or translucent undercoating 24 as shown in FIG. 1(c). The aluminum metal reacts with the ammonium hydroxide solution and is converted to aluminum compounds which are believed to be oxides, hydroxides, and/or complexes of aluminum. The conversion typically requires about 30 minutes. The coated substrate with the converted undercoating 24 is placed in running deionized water for about 30 minutes or more to remove residual ammonium hydroxide and soluble salts that may be present. The coating 22 and the converted undercoating 24 are dried in air and are ready for subsequent processing and assembly into an electronic device. The dried coating may be subjected to filming reagents with or without the baking step that is normally required prior to aluminizing in making viewing screens, as for image intensifier tubes.

The coating 22 has an unusually strong adherence to the substrate 10 especially with regard to resistance to disruption by water or filming lacquers as compared with phosphor coatings deposited by most other methods. The coating 22 of the sample can resist electric fields of at least 20,000 volts without being torn from the substrate. In addition, the coating can resist violent turbulence from rapidly flowing gases or liquids directed against the coating.

EXAMPLE 2

Follow the procedure described in Example 1 except substitute the following suspension for the suspension described therein:

500 milligrams particles of phosphor such as manganese-activated zinc orthosilicate
1,832 milliliters isopropyl alcohol
14 milliliters water
160 milligrams hydrated thorium nitrate $Th(NO_3)_4 \cdot H_2O$

Some general considerations

Previous technical literature dealing with the electrophoretic deposition of a phosphor layer upon a metallized surface refers either (1) to no subsequent removal or treatment of the metal layer or (2) to the subsequent removal of the metal layer. Using the novel method, the metal layer or undercoating underlying the particle coating is not removed, but is transformed or converted into a transparent or translucent compound. It is important that the metal layer is not removed because the adherence of the overlying particle coating would be adversely affected by such removal. The metal layer is converted or transformed into a material which serves as a binder for the overlying particle coating and the support surface and thereby improves the adherence of the particle coating to the substrate. After the conversion step, the particle coating can be subjected to handling comparable to and often exceeding that given to coatings prepared by settling and which contain inorganic silicates as binders and subsequently baked to set the binder. The conversion of the undercoating in the novel method has been found not to adversely affect the performance of the particle coating as a viewing-screen structure.

The substrate 10 may be of any material which is substantially nonreactive in the novel method. Where the substrate must be light transmitting, glass, mica, quartz, and acrylic polymer (such as Lucite) are examples of suitable substrate materials. The substrate may be opaque to light.

The undercoating 12 may be of a metal, such as aluminum, zinc, indium and magnesium, or a nonmetallic, such as silicon or germanium. The undercoating should be of a material that is chemically stable to the suspension used during electrophoretic deposition and which is convertible to a compound that adheres to the substrate after the deposition. In most cases, it is desirable that the compound is white and is transparent or translucent. In some applications, it may be advantageous to employ a metal, such as cadmium, that can be converted to a colored compound. In the examples, the aluminum undercoating has a thickness of about 75 to 150 angstroms and a light transmission of about 45 to 55 percent. Too thick an undercoating requires longer conversion times which may adversely affect the overlying particle coating. Too thin an undercoating may not provide sufficient conductivity for the electrophoretic deposition of the particle coating.

The particles in the suspension 18 may be one or a combination of materials which are chemically stable to the ingredients of the suspension and to the conversion reagent. The particles may be of a luminescent material such as a sulfide of zinc, zinc-cadmium, or calcium activated with silver, copper, gold, or a rare-earth element; or oxygen-dominated phosphors such as silicates or oxides of zinc, yttrium or calcium activated with manganese, cerium, or lead. The particles may be of a nonluminescent material such as sodalite, silica, alumina, mica, and barium titanate.

The suspension 18 and the deposition step employ principles known in the art of electrophoretic deposition. The suspension 18 should have sufficient conductivity to deposit the particles, but too much conductivity will cause the process to be inefficient and poorly controlled. Generally, the deposition voltages are in the range of about 100 to 300 volts, and the currents passed in the suspension are in the range of about 100 to 250 milliamperes for a substrate (cathode) of about 2500 square centimeters spaced about 5 centimeters from the anode. The suspension in the examples employs an essentially insulating liquid (isopropyl alcohol) and a portion of water and an electrolyte (aluminum nitrate or thorium nitrate) to provide the desired conductivity in the suspension. Other liquids and salts can be used for the same purposes. In some suspensions, the water and salt can be omitted and only an organic liquid, such as methyl alcohol or acetone, used to suspend the particles. The anode and cathode spacing is not critical.

The conversion of the undercoating (metal layer) 12 is achieved with a reagent suitable to the composition of the undercoating. The conversion step may be wet; that is, carried out by contacting the undercoating with a solution of a reagent; or it may be dry; that is, carried out by baking the undercoating in the presence of a gaseous reagent. For the wet conversion of aluminum and magnesium layers, it is preferred to use a dilute ammonium hydroxide solution having a concentration up to about 0.01 weight percent. Higher concentrations or excessive exposure times may have the effect of dissolving out the aluminum and weakening the bond. Other bases such as sodium hydroxide and potassium hydroxide can be employed as the conversion reagent as long as the concentration and time balance is such that the metal undercoating is not converted into soluble compounds which can be dissolved out, and/or that the glass itself is not attacked in such a way as to loosen the bond between the glass surface and the converted metal compound. Some dilute acids such as sulfuric and acetic acids can also be used to convert the metal undercoating. For wet conversions, it is preferred that the converted material is substantially insoluble in water. For the dry conversion of aluminum or magnesium, it is preferred to bake the structure in air at about 150° to 500° C. and preferably about 425° C. For dry conversions, the converted material may or may not be insoluble in water.

I claim:
1. A method of producing a coating of particles upon an electrically-insulating support comprising
   (a) depositing a substantially continuous electrically-conducting layer of aluminum metal on said support,
   (b) electrophoretically depositing a coating of said particles on said aluminum metal layer,

(c) and then contacting said aluminum metal layer with an ammonium hydroxide solution until said layer is converted to aluminum compounds.

References Cited

UNITED STATES PATENTS

| | | | |
|---|---|---|---|
| 2,851,408 | 9/1958 | Cerulli | 204—181 |
| 3,314,871 | 4/1967 | Heck et al. | 204—181 |
| 3,360,450 | 12/1967 | Hays | 204—181 |
| 3,525,679 | 8/1970 | Wilcox et al. | 204—181 |
| 3,551,306 | 12/1970 | Grosso et al. | 204—181 X |
| 3,681,222 | 8/1972 | Gupton, Jr. | 204—181 |
| 3,681,223 | 8/1972 | Gupton, Jr. | 204—181 |

JOHN H. MACK, Primary Examiner

A. C. PRESCOTT, Assistant Examiner